(12) United States Patent
Shams et al.

(10) Patent No.: US 9,710,753 B1
(45) Date of Patent: *Jul. 18, 2017

(54) COLLABORATION OF AUDIO SENSORS FOR GEO-LOCATION OF EVENTS IN AN ARTIFICIAL INTELLIGENCE (AI) ENVIRONMENT

(71) Applicant: Lumin, LLC, San Jose, CA (US)

(72) Inventors: Nima Lahijani Shams, San Jose, CA (US); Vinay Venkatesh Malekal, San Jose, CA (US); Narges Banou Nourshahi, Fremont, CA (US)

(73) Assignee: Lumin, LLC, San Jose, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 14/521,450

(22) Filed: Oct. 22, 2014

Related U.S. Application Data (60) Provisional application No. 61/896,651, filed on Oct. 28, 2013, provisional application No. 61/901,436, filed on Nov. 7, 2013, provisional application No. 61/894,383, filed on Oct. 22, 2013.

(51) Int. Cl.
| | | |
|---|---|---|
| *G06N 5/04* | (2006.01) | |
| *H04L 29/08* | (2006.01) | |
| *H04L 12/28* | (2006.01) | |

(52) U.S. Cl.
CPC .......... *G06N 5/04* (2013.01); *H04L 12/2803* (2013.01); *H04L 67/10* (2013.01)

(58) Field of Classification Search
CPC ........ G06N 5/04; H04L 12/2803; H04L 67/10
USPC .......................................................... 706/46
See application file for complete search history.

(56) References Cited

U.S. PATENT DOCUMENTS

| | | | |
|---|---|---|---|
| 7,223,781 B2 * | 5/2007 | Dannhardt | ........... A61K 8/4946 514/398 |
| 7,663,502 B2 * | 2/2010 | Breed | ..................... B60C 11/24 340/12.25 |
| 2003/0228035 A1 | 12/2003 | Parunak et al. | |
| 2004/0024851 A1 | 2/2004 | Naidoo et al. | |
| 2014/0207721 A1* | 7/2014 | Filson | ................. H04L 12/1895 706/46 |
| 2014/0226855 A1 | 8/2014 | Savvides et al. | |

(Continued)

*Primary Examiner* — Stanley K Hill
*Assistant Examiner* — Tsu-Chang Lee
(74) *Attorney, Agent, or Firm* — Law Office of Dorian Cartwright; Dorian Cartwright (57) ABSTRACT

An artificial intelligence (AI) system leverages collaboration of multiple audio sensors for geo-location of an event. Location information is stored for each of the plurality of geographically-dispersed AI clients. Each of the AI clients can include an audio sensor, a network controller, and a feedback mechanism (e.g., a speaker or an LED) within a common enclosure. Responsive to detection of an event (e.g., involving a human, machine, or ambient condition) at two or more of the plurality of geographically-dispersed AI clients, audio event data is centrally received from audio sensors of the two or more of the plurality of geographically-dispersed AI sensors. A location is estimated based on the location information and the audio event data. Responsive to classification of the event in view of the estimated location, a command is received for a response to the event at the AI clients that detected the event, or others.

17 Claims, 9 Drawing Sheets

(56) References Cited

U.S. PATENT DOCUMENTS

| | | | |
|---|---|---|---|
| 2014/0266669 A1* | 9/2014 | Fadell | G05B 19/042 340/501 |
| 2014/0277769 A1* | 9/2014 | Matsuoka | G06Q 50/06 700/278 |
| 2015/0018979 A1* | 1/2015 | Tomii | G06Q 50/10 700/19 |

* cited by examiner

COLLABORATION OF AUDIO SENSORS FOR GEO-LOCATION OF EVENTS IN AN ARTIFICIAL INTELLIGENCE (AI) ENVIRONMENT

CROSS-REFERENCE TO RELATED APPLICATIONS

This application claims the benefit of priority under 35 U.S.C. 119(e) to U.S. Application No. 61/894,383, filed Oct. 22, 2013, entitled HOME/OFFICE ARTIFICIAL INTELLIGENCE (AI) USING EMBEDDED SENSORS, by Nima Lahijani Shams et al., Application No. 61/896,651, filed Oct. 28, 2013, entitled COLLABORATION OF SENSORS IN AN ARTIFICIAL INTELLIGENCE (AI) ENVIRONMENT, by Nima Lahijani Shams et al., and Application No. 61/901,436, filed Nov. 7, 2013, entitled COMMANDING CLOUD-BASED APPLICATIONS FROM AN ARTIFICIAL INTELLIGENCE (AI) ENVIRONMENT USING CONSUMER ELECTRONIC DEVICES, by Nima Lahijani Shams et al., the contents of each being hereby incorporated by reference in its entirety.

FIELD OF THE INVENTION

The invention relates generally to computer software, and more specifically, to a collaboration of audio sensors in an artificial intelligence (AI) environment.

BACKGROUND

Home AI refers to various levels of automation for appliances and electronics in homes, businesses, automobiles, and other environments. Many conventional systems provide low levels of automation, and are closed to a predefined list of commands. For example, a coffee maker can be programmed to brew coffee at a certain time, lights in the home can be turned on automatically due to low lighting conditions, and power to electronics can be "clapped" on or "clapped" off. Also, smoke detectors and thermostats can perform certain actions based on certain direct instructions.

With the addition of networking, home automation devices can send alerts through a network. For instance, a conventional security system or fire detection system can send alerts through a network because of an intrusion or fire emergency, respectively. Other types of automation operate according to voice commands when a button is pushed to activate the voice command mode, such as on smart phones and in automobiles.

Problematically, conventional home AI fails to provide higher levels of automation that allow a more natural interaction with humans because devices operate in isolation and for a singular purpose. Further, smartphone-based AI (e.g., Siri by Apple Computers of Cupertino, Calif.) and other hardware (e.g., the smoke detector and the thermostat) relies upon a user carrying around and intentionally interacting with the smartphone or a specific piece of hardware.

What therefore is needed is a technique that collaborates and analyzes distributed sensor input in a command-control AI environment to determine and react to a user location.

SUMMARY

To meet the above-described needs, methods, computer program products, and systems for collaboration of audio sensors for geo-location of events in an artificial intelligence (AI) environment, such as home, office, outdoor area, or business.

In one embodiment, location information is stored for each of the plurality of geographically-dispersed AI clients. Each of the AI clients can include an audio sensor, a network controller, and a feedback mechanism (e.g., a speaker or an LED) within a common enclosure. Responsive to detection of an event (e.g., involving a human, machine, or ambient condition) at two or more of the plurality of geographically-dispersed AI clients, audio event data is centrally received from audio sensors of the two or more of the plurality of geographically-dispersed AI sensors. For example, a user can speak a command for turning on lights while walking down a flight of stairs that is detected by one AI client at the top of the stairs and one at the bottom of the stairs.

A location is estimated based on the location information and the audio event data. Responsive to classification of the event in view of the estimated location, a command is received for a response to the event at the AI clients that detected the event, or others. Returning to the example, not only can an AI client turn on lights to illuminate the stairs, an AI client in a downstairs living room can turn on lights based on predicted movement, while an AI client in an upstairs bedroom can turn off lights provided that no other human audio or movement is detected there.

Advantageously, the user experience with AI is more natural because the AI is not dependent on users carrying around a device for location-based AI interactions.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

To meet the above-described needs, methods, computer program products, and systems for collaboration of audio sensors for geo-location of events in an artificial intelligence (AI) environment, such as home, office, or business.

Overview of Features

The scalable AI, command-control system is an adaptive AI that can learn the habits of one or more individuals and one or more environments for a better user experience. As a result, actions taken by the AI system become more accurate over time. Microphones and speakers distributed in consumer appliances around the home allow natural voice interaction without a physical device needing to be worn or held. Each consumer appliance can also be outfitted with a feedback mechanism, such as an LED light, a speaker, a buzzer or display, and even feedback on a separate device. Other sensors on consumer appliances can collect data about the household for storage in a database.

Advantageously, users can perform normal tasks around the home as the present AI system tracks patterns and learns behaviors to automatically make those tasks easier using prediction algorithms (e.g., automatic lighting based on user movements, detection and notification of house activity via SMS). Exceptions to predicted actions can raise red flags (e.g., identification of medical emergency). Users can interface with the AI system by talking naturally for hands-free control and management for non-automated voice commands and interactions (e.g., lights come one automatically, and user requests a certain color or intensity as a modification). The AI system acts as an assistant (e.g., notifying user of incoming calls or guests). Users can retrieve public and personal information from the cloud (e.g., sports scores, bank account balances, Facebook statuses, etc.), make purchases (e.g., using Amazon.com APIs), enter new calendar appointments (e.g., using Google.com APIs for calendar application), and the like.

The system can also provide feedback to users. Sounds and lights can confirm commands and communicate modes of the system (e.g., voice response stating "your order will be delivered Friday" or green blinking LED). The examples of this description are merely illustrative and are not intended to be limiting as one of ordinary skill in the art will recognize many variations consistent with the spirit of the inventions as specifically described herein.

Home automation, as referred to throughout the description, should be understood to be an exemplary environment. Other environments include offices, automobiles, business, wearables, parking lots, shopping malls, gyms, libraries, hybrid environments, multi-system environments, and the like. Consumer appliances and electronics refer to just a few categories of devices that can be manufactured for or retrofitted to plug in to the AI system. Also, users can be owners of the systems, or employees, guests, customers or others that interact with the systems of others.

Systems for Home Automation Using Sensors on AI Appliances

Figure 1A:
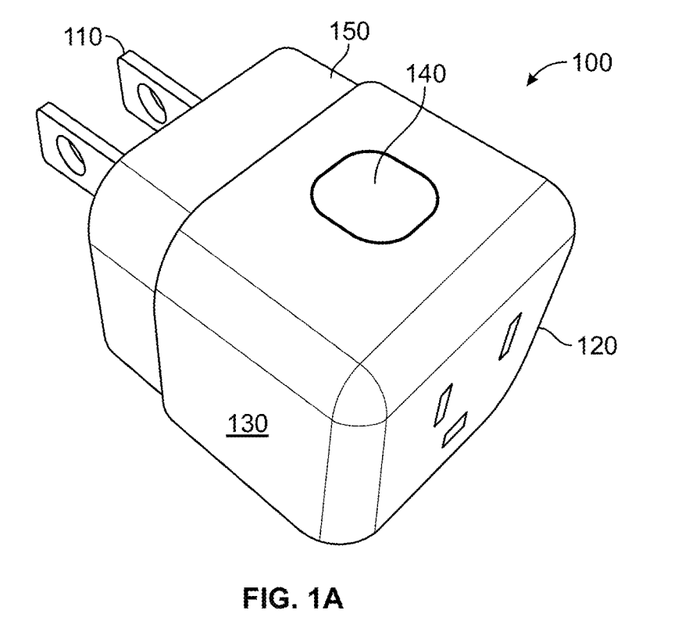
FIGS. 1A and B are schematic diagrams illustrating perspective views of an artificial appliance (AI) appliance, according to one embodiment.
Figure 1B:
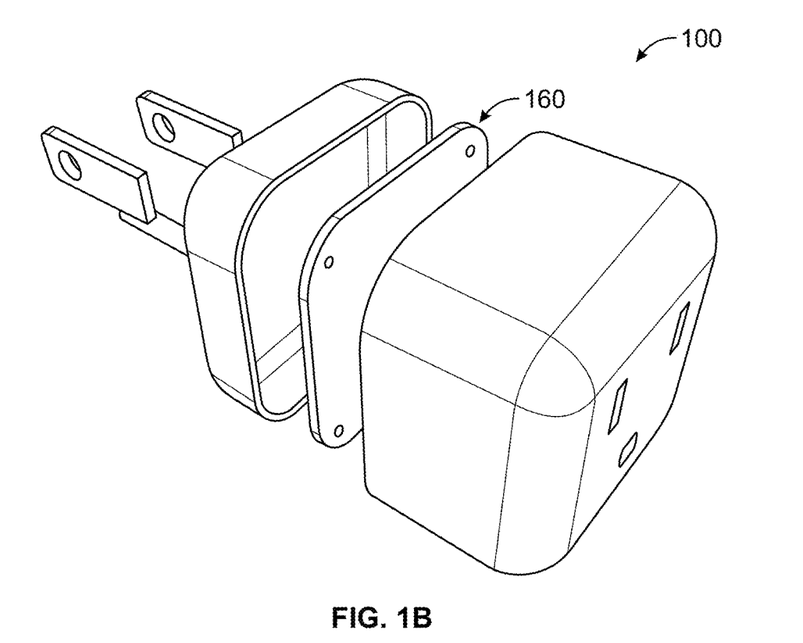

FIGS. 1A and B are schematic diagrams illustrating perspective views of an AI appliance 100 in the form of wall outlets, according to one embodiment. The AI appliance 100 modifies a traditional wall outlet to a provide AI with a plug 110 for insertion into an electrical outlet receptacle at one end and a receptacle 120 for an electrical appliance, to be controlled by the AI appliance 100, to plug in to an opposite end. An enclosure 130 can be composed of plastic, rubber, or any appropriate material. A button 140 on a top side of the enclosure allows manual controls such as power on, power off, and reset. A colored portion 150 of the enclosure covers an LED light to give a user visual feedback to events detected by sensors. Some AI appliances modify existing traditional appliances (e.g., over wall outlet as 100) while others integrate existing traditional appliances (e.g., in wall outlet installed into the drywall (not shown)).

An exploded view of the AI appliance 100 in FIG. 1B exposes a motherboard or printed circuit board (PCB) 160 used to implement AI circuitry. Sensors, a transceiver, an antennae, a central processing unit (CPU), a power supply and/or power controller, memory element, or other electronic components can be attached to the board (see e.g., FIG. 2). Many other types of appliances can be AI appliances as described herein.

Figure 2:
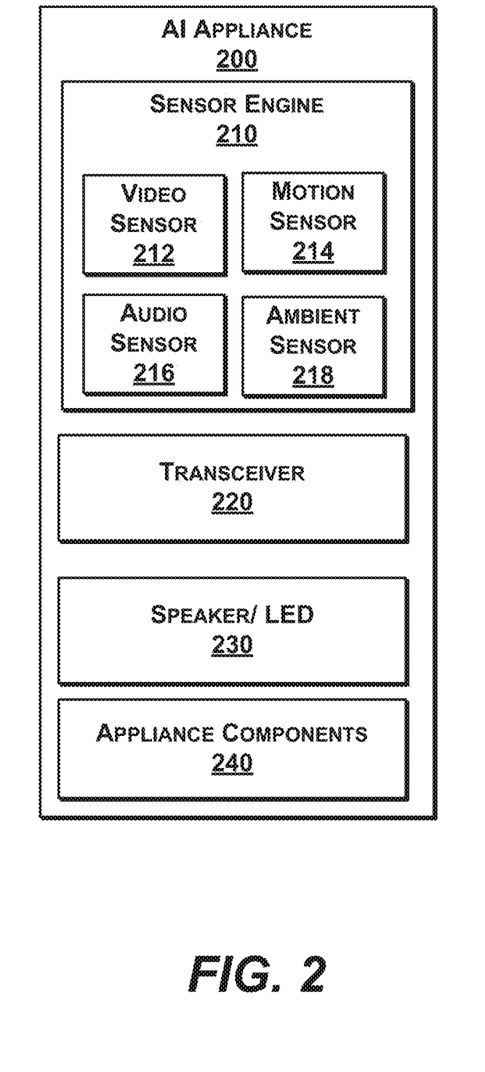
FIG. 2 is a more detailed block diagram illustrating components of an AI appliance, according to one embodiment.

FIG. 2 is a block diagram illustrating an AI appliance 200, according to one embodiment. A sensor engine 210 collects raw data that is analyzed by a centralized AI server, at times in aggregation with raw data collected at other locations. The present embodiment includes a video sensor 212, a motion sensor 214, an audio sensor 216, temperature sensor, humidity sensor, gas detector and an ambient light sensor 218. The sensors continually collect data in a temporary memory, in one embodiment, that can be framed and transmitted as a file upon detecting an event (e.g., MP3 file or MP4 file). The present configurations of sensor are merely illustrative and can be implementation-specific.

A transceiver 220 transmits the raw data collected by sensors to a centralized AI server and/or other external resources. Complementary software components can be provide such as IP protocol stack software. The transceiver 220 can operate in accordance with protocols, such as Wi-Fi, Bluetooth, an electrical outlet protocol, or any other type of wireless communication standard.

A speaker/LED 230 allows the system to provide feedback to users. Computer generated voices can ask questions concerning predicted actions or respond with confirmations of an event. An action with one AI appliance 200 can be confirmed with feedback at a different AI appliance 200 responsive to movement, location of user, or feedback capability (e.g., an AI appliance with a speaker may take over feedback if the initiating AI appliance only has an LED light and voice feedback is preferred). Alternatively, the confirming action initiated by one user may concern a different user that is detected at a different location. Numerous forms of chirping, blinking, and the like can be implemented.

Appliance components 240 can be any traditional components for operations for the appliance. For an AI refrigerator, the appliance components 240 include a condenser and fan. For a wall component, the appliance components 240 include a receptor and terminals circuit connections. In some cases, the appliance components 240 have feedback to the AI components for functions such as power consumption monitoring, on/off toggling, and the like. In some embodiments, a traditional appliance is converted to an AI appliance, for example, by using an outlet that is an AI appliance.

Figure 3:
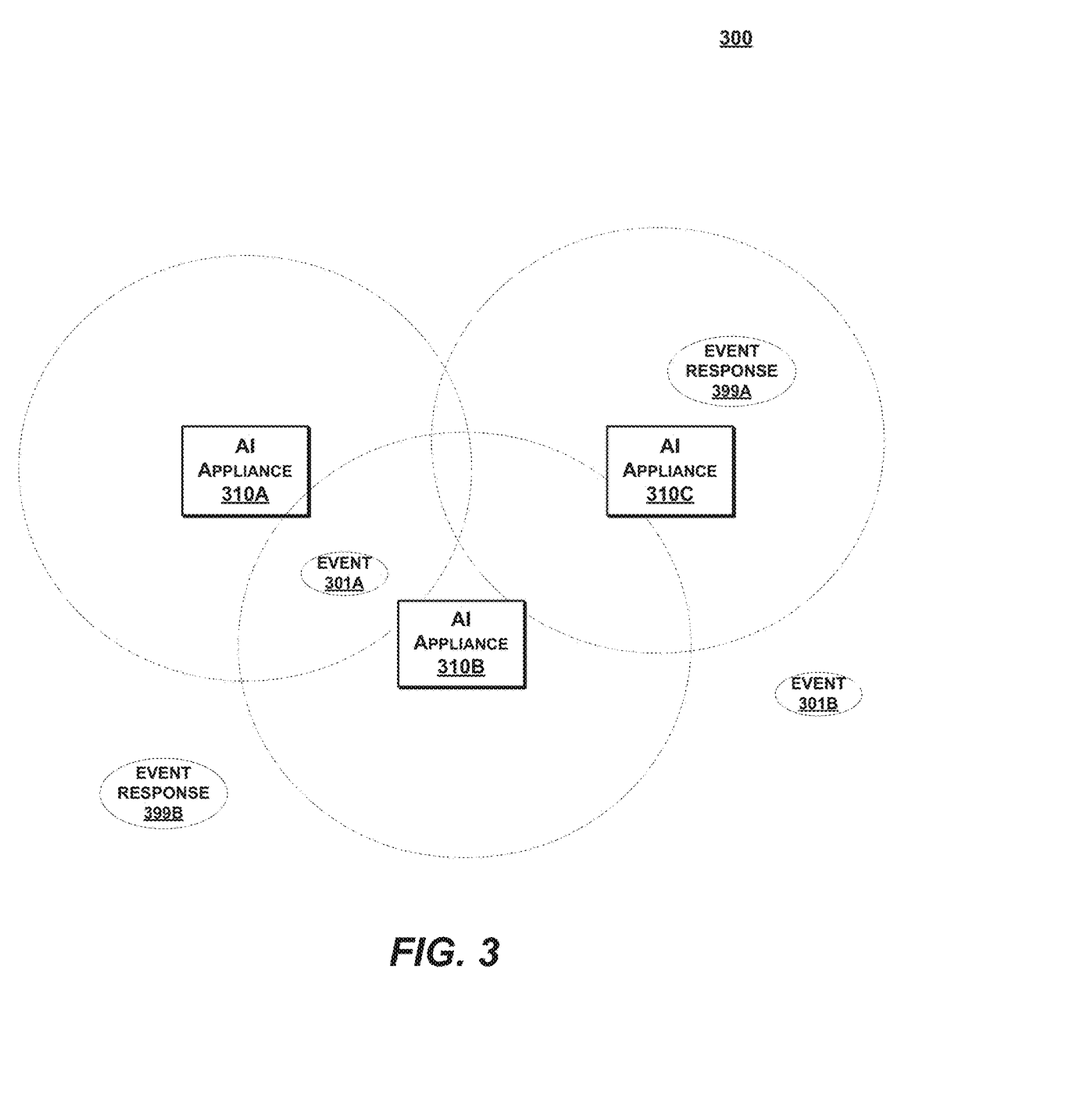
FIG. 3 is a block diagram illustrating AI appliances coordinated for providing home automation, according to one embodiment.

FIG. 3 is a block diagram illustrating a system 300 with AI appliances 310A-C coordinated for providing home automation, according to one embodiment.

Event 301 occurs at a location in an AI environment within range of sensors on AI appliance 310A and AI appliance 310B. Events can originate from human commands, human activities, machine activities, ambient conditions, or the like. As a result, more than one AI appliance collects sensor data for analysis. In one embodiment, the analysis geo-locates event 301 based on sound intensity and known locations of sensors. With a third sensor located at a third location, the accuracy increases as the third input allows a triangulation of sound intensity. In another embodiment, motion sensors or video cameras are used for geo-location. In other embodiments, chemical analysis and other ambient measurements are taken at different locations for analysis.

Event response 399 occurs, in this embodiment, at a location distinct from event 301. For example, a user enters a home at event 301 and a coffee machine (e.g., plugged into AI appliance 310C) turned on at event response 399.

Figure 4:
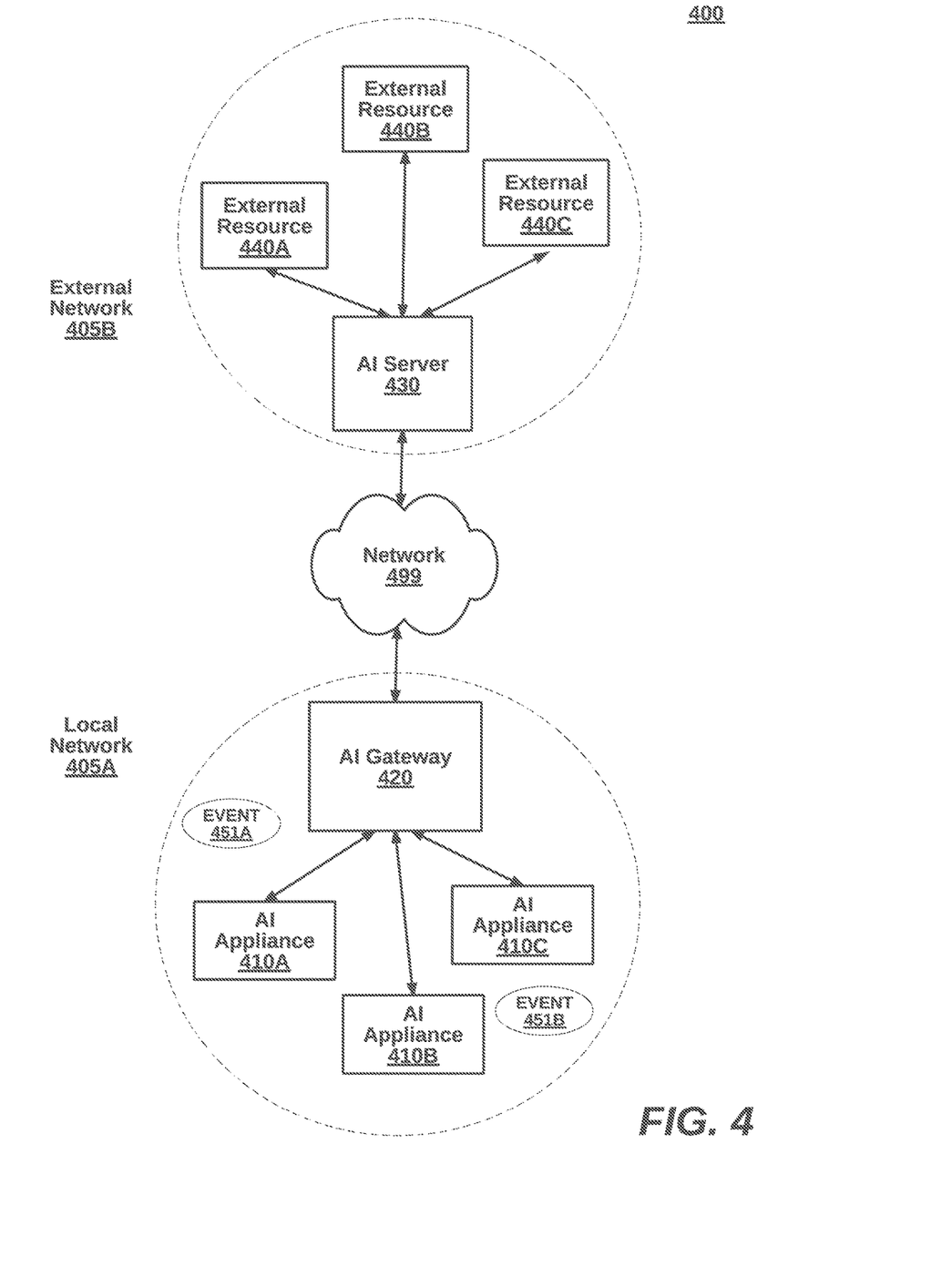
FIG. 4 is a high-level block diagram illustrating an exemplary system for providing home automation using an external network, according to one embodiment.

FIG. 4 is a high-level block diagram illustrating a system 400 for providing home automation using an external network 405B, according to one embodiment. The system 400 comprises an internal network 405A coupled to the external network 405B via the network 499. The connections can be wired, wireless, or a combination of both using Mediums such as the Internet, 3G/4G cellular networks, analog telephone lines, power lines, or the like.

The internal network 405A can represent a home, business, automobile, or combination of environments connected by a local area network (LAN) or other network. The internal network 405A includes AI appliances 410A-C and an AI gateway 420. The AI appliances 410A-C can be any consumer appliance or electronic device appropriate to integrate with the system 400. The AI appliances 410A-C in some embodiments are thin devices that rely on the AI gateway 420 for access to the external network 405B. Examples include wall plugs, over wall outlets, lamps, scones, switches, smoke detectors, home appliances (e.g., toasters and microwaves) and the like. More AI appliances and sensor improve AI performance. The AI gateway 420 accesses the external network 405B using, for example, a MAC card, a Bluetooth radio, an IEEE 802.11 wireless card, or the like. The AI gateway 420 can be a dedicated box, an application executing on a PC or network device, or an AI appliance acting as a master to other slave appliances. Also, the AI appliances 410A-C can be communicatively coupled in a mesh network, such that one AI appliance proxies as an access point for another. In another example, one device may have a Bluetooth connection only, and need to proxy through a device that is connected to the AI gateway 420 through an Ethernet connection.

The external network 405B can represent resources available through the network 499. The external network 405B includes AI server 430 and external resources 440A-C. The AI server 430 provides centralized management of the AI appliances 410A-C and processing of input from one or more sensors of one or more AI appliances 410A-C. The external resources 440A-C can be accessed by the AI server 430 on behalf of the AI appliances 410A-C. The external resources 440A-C can be, for example, online applications such as Pandora, Facebook, Google Search or Google Calendar.

In one example, event 451A is caused by a user requesting a calendar entry or song purchase from iTunes. The user is located proximate to the AI appliance 410A but may also be detected by audio sensors located further away on one of the other AI appliances 410B-C. The AI server 430 in this example, could geo-locate the user based on the amplitude of sound detection at the various sensors. With knowledge of a location, lights or other electronics can be activated in accordance with a user in that location. The AI server 430 could also recognize the user and activate electronics or trigger an event in a manner that is customized to a particular user.

In another example, event 451B is caused by an ambient condition such as a washing machine buzzer detected by one or more sensors. When a sound clip is received at the AI server 430, a local database or an external database can be searched in order to identify the event. Once identified, an appropriate event response can be executed. One event response can be a message displayed on a television detected as being on. Another event response can be an SMS message or an e-mail message that is automatically generated to include a description of the identified event and sent to a user.

The system 400 can have many variations, with more or less components, such as a system of AI appliances that are peers and share date between themselves, and AI appliances that are autonomous in that they individually connect to the AI server 430 or the external resources 440A-C. One implementation provides various levels of encryption. Another implementation includes a mobile user device (not shown) connected to the network 499, such as a smart phone, a tablet device, a laptop or even a stationary PC. The mobile device can be used as an additional AI appliance that interacts with the system 400 from within or outside of the environment. Additionally, sensor data and event feedback and confirmations can also be sent to the mobile device. Moreover, the system 400 can connect to outside AI systems (e.g., two different office locations, or a user's home and automobile).

Methods for Providing Home Automation Using Sensors on AI Appliances

Figure 5:
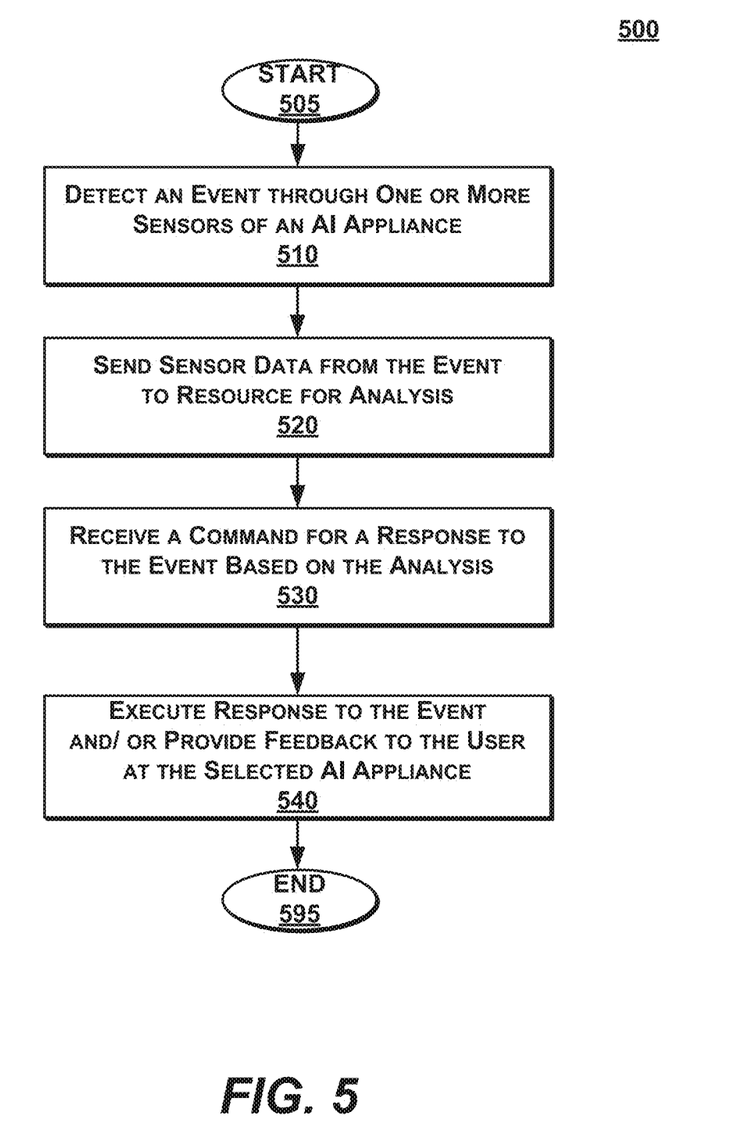
FIG. 5 is a flow diagram illustrating a method for providing home automation using an AI appliance, according to one embodiment.

FIG. 5 is a flow diagram illustrating a method 500 for providing home automation using an AI appliance, according to one embodiment. The method 500 can be implemented in any of the devices discussed above.

An event is detected through one or more sensors of an AI appliance (step 510). For instance, an audio sensor can have a volume threshold that defines an event once exceeded. A duration of an event can span an entirety of time that the volume remains about the threshold. The duration can also span a predetermined amount of maximum time. In some embodiments, constant or long-term sounds can be ignored or filtered. An event as defined by one sensor can define an event for another sensor. For example, if an audio event is detected, a bio sensor or temperature sensor can collect data over a corresponding duration, in order to provide a more robust response.

Sensor data is sent from the event to a resource for analysis (step 520). The analysis can occur at a local, or cloud-based server, or at a master AI appliance. The analysis interprets the event in order to determine an event response. A table or default or customized commands can be stored for correlating an identified event with a response sent back to an AI appliance. Certain events can be configured. For example, a new stove or alarm clock can be added through a user interface, causing a manufacturing download of sounds to be added to a database.

In some embodiments, an AI server accesses an external device for a query or other interaction with remote applications. Results can be sent back to the AI server or directly back to an AI appliance.

A command is received for a response to the event based on the analysis (step 530). The response to the event is executed and/or feedback is provided to the user, at the selected AI appliance (step 540). For example, an online music service is activated responsive to an event of a user asking for music. An LED light or voice can communicate a successful transaction. The music service can involve a first device while the LED light or voice feeds back at a second device, in some embodiments.

Figure 6:
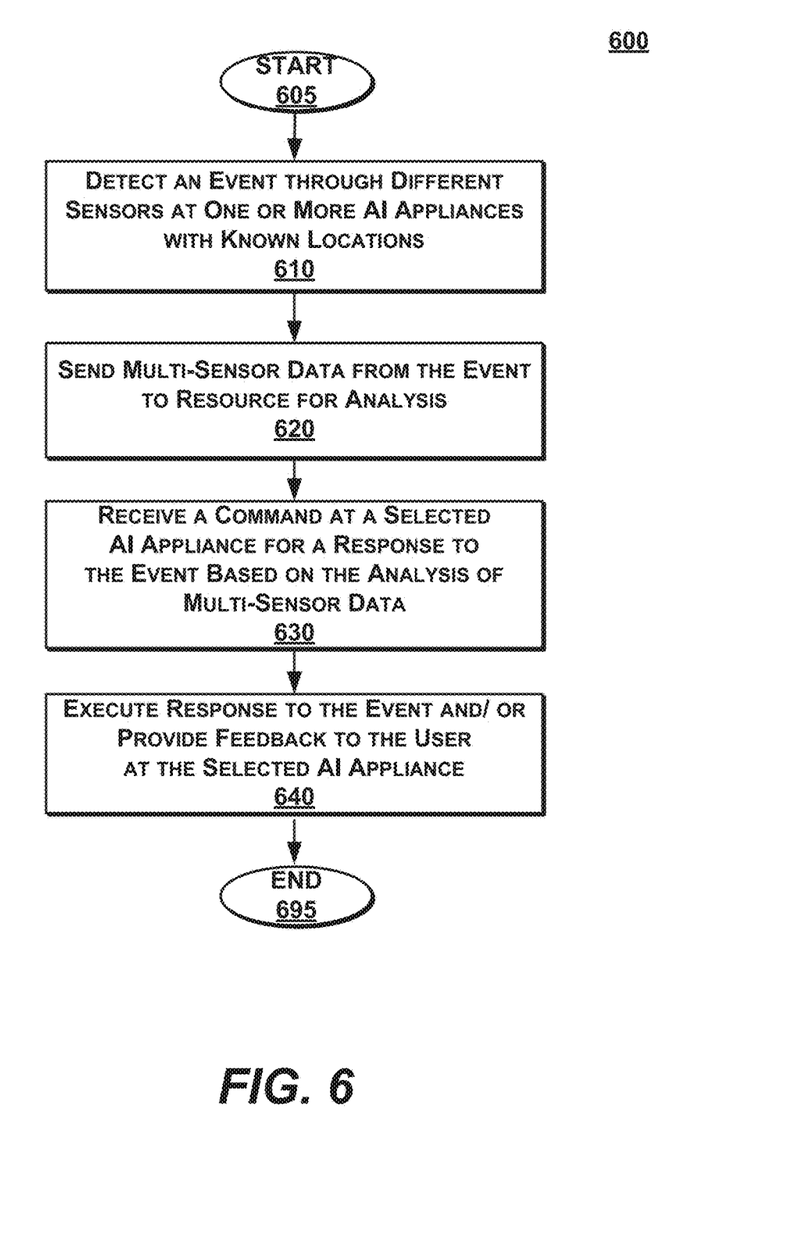
FIG. 6 is a flow diagram illustrating a method for coordinating multiple sensors to provide home automation using AI appliances, according to one embodiment.

FIG. 6 is a flow diagram illustrating a method 600 for coordinating multiple sensors to provide home automation using AI appliances, according to one embodiment.

An event is detected through different sensors at one or more AI appliances at a known location (step 610), as discussed in more detail below in association with FIG. 7. The locations can be preconfigured or determined using GPS, Wi-Fi triangulation, or other location technologies. In an embodiment, the layout of an environment including AI clients and other features (e.g., stairs, doors, bathrooms, etc) are programmed by using a smartphone with location technology to take a location snapshot while also allowing a user to enter a description or scan a QR code or other identifier. The geographically-dispersed AI appliances are shown and discussed above in association with FIG. 3. The different sensors can also be embedded in a single device.

Multi-sensor data from the event is sent to a resource for analysis (step 620). The multiple perspectives affords a better characterization of events such as geo-location. A 3-dimensional data set forms from multiple inputs that traditional systems merely receive as linear data.

A command is received at a selected AI appliance for a response to the event based on the analysis of multi-sensor data, i.e., a response command (step 630), as discussed below and illustrated in FIG. 8. The response to the event is executed and/or feedback is provided to the user at the selected AI appliance (step 640), for example, at the detecting AI appliances or an application. The application can be embedded in an AI appliance or be a remotely located service (e.g., a cloud-based application).

Figure 7:
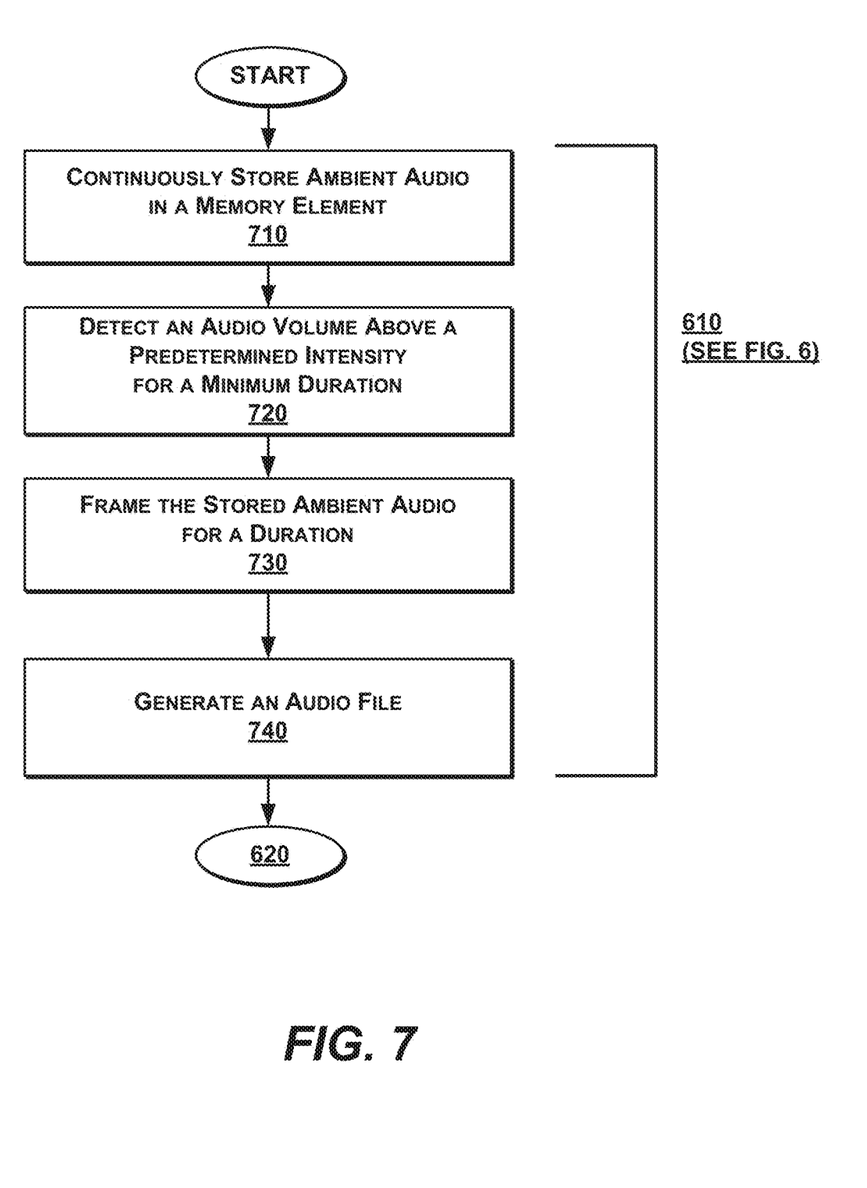
FIG. 7 is a more detailed flow diagram illustrating a step of detecting an event through different sensors at one or more AI appliances of the method of FIG. 6, according to one embodiment.

FIG. 7 is a more detailed flow diagram illustrating the step 610 of detecting an event through different sensors at one or more AI appliances of the method 600 of FIG. 6, according to one embodiment. Ambient audio is continuously stored in a memory element (step 710). An audio volume (or other characteristic) above a predetermine intensity for a minimum duration is detected (720), as indicative of a possible event. The stored ambient audio is framed for a certain duration (e.g., a duration above the predetermined intensity, or a sample thereof) (step 730). An audio file is generated from the framed ambient audio (e.g., compressed audio file suitable for network transmission)(step 740).

Figure 8:
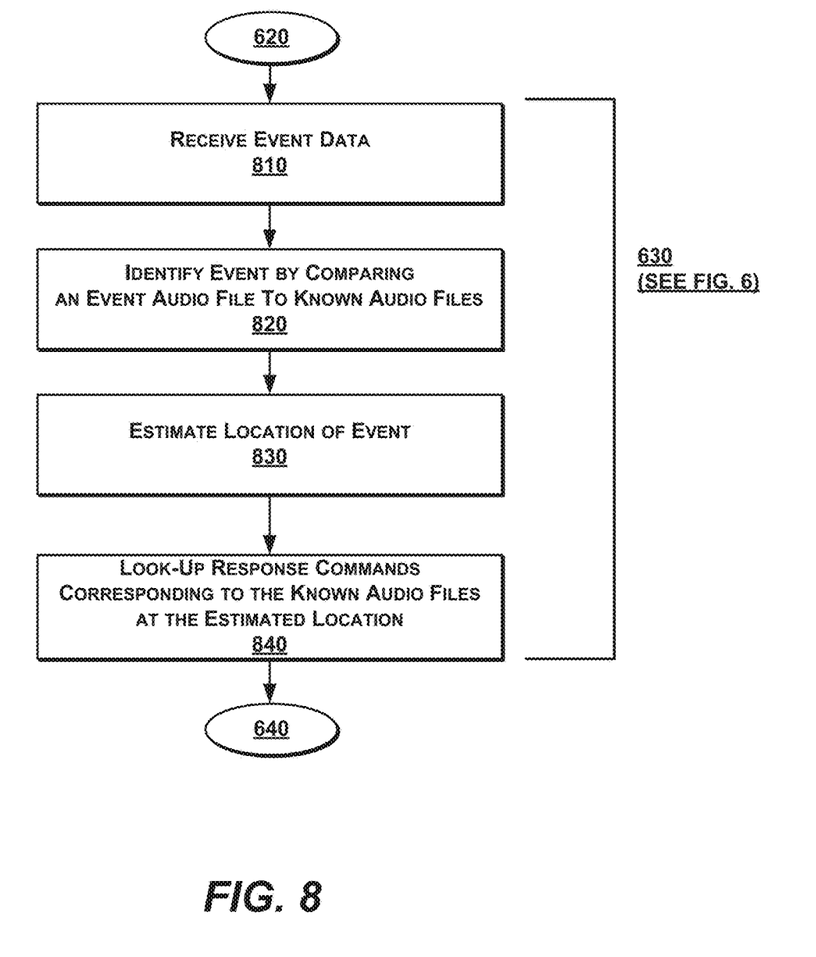
FIG. 8 is a more detailed flow diagram illustrating a step of analyzing multi-sensor data to determine a response command of the method of FIG. 6, according to one embodiment.

FIG. 8 is a more detailed flow diagram illustrating the step 630 of analyzing multi-sensor data to determine a response command of the method 600 of FIG. 6, according to one embodiment. Event data is received (step 810). An event is identified from the event data by comparing an event audio file to a table or records of known audio files (step 820). A location of the event is estimated (step 830). Finally, a response command corresponding to known audio files in view of the estimated location is looked-up (step 840)

Figure 9:
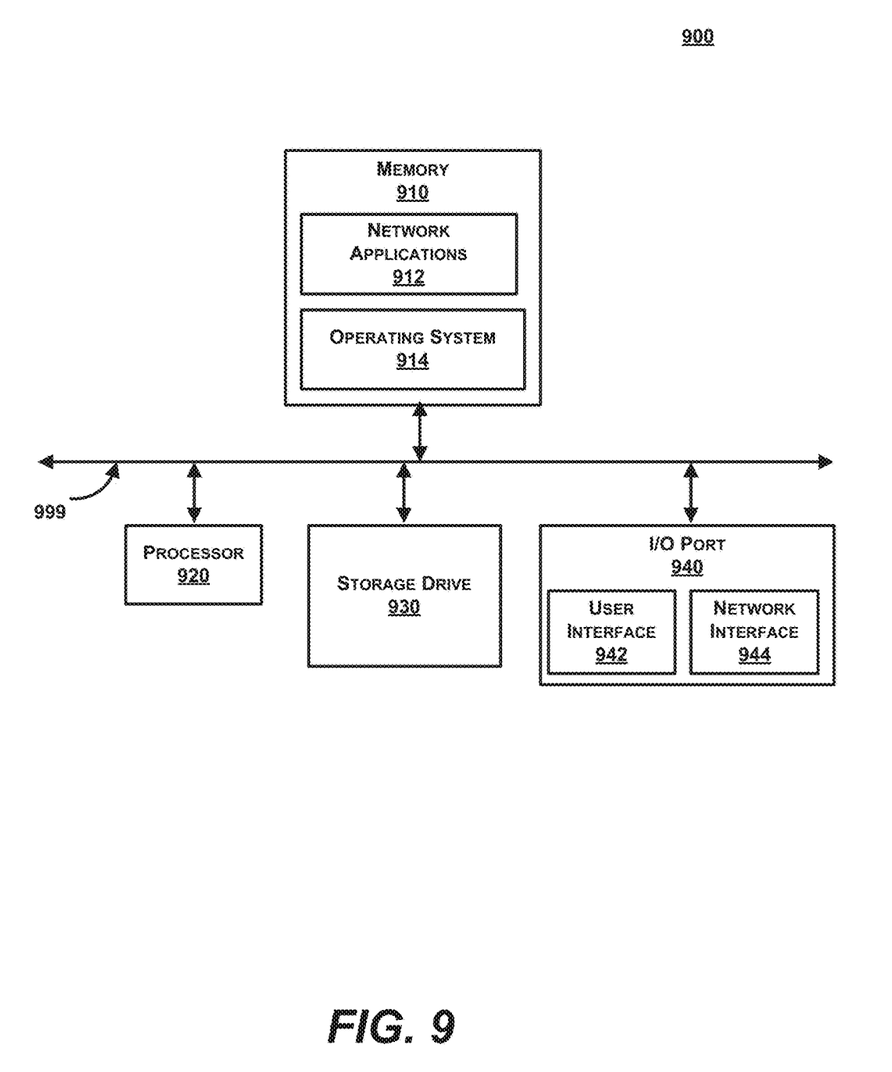
FIG. 9 is a block diagram of an exemplary computing device, according to one embodiment.

Generic Computing Device (FIG. 9)

FIG. 9 is a block diagram illustrating an exemplary computing device 900 for use in the system 400 of FIG. 4, according to one embodiment. The computing device 900 is an exemplary device that is implementable for each of the components of the system 100, including the AI gateway 420 and the AI server 410. The computing device 900 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 900, of the present embodiment, includes a memory 910, a processor 920, a storage drive 930, and an I/O port 940. Each of the components is coupled for electronic communication via a bus 999. Communication can be digital and/or analog, and use any suitable protocol.

The memory 910 further comprises network applications 912 and an operating system 914. The network applications 920 can be the instant messenger application 210 and/or the instant messenger module 220). Other network applications 912 can include a web browser, a mobile application, an application that uses networking, a remote application executing locally, a network protocol application, a network management application, a network routing application, or the like.

The operating system 914 can be one of the Microsoft Windows® family of operating systems (e.g., Windows 99, 98, Me, Windows NT, Windows 2000, Windows XP, Windows XP x64 Edition, Windows Vista, Windows CE, Windows Mobile, Windows 9 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 920 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 920 can be single core, multiple core, or include more than one processing elements. The processor 920 can be disposed on silicon or any other suitable material. The processor 920 can receive and execute instructions and data stored in the memory 910 or the storage drive 930.

The storage drive 930 can be any non-volatile type of storage such as a magnetic disc, EEPROM, Flash, or the like. The storage drive 930 stores code and data for applications.

The I/O port 940 further comprises a user interface 942 and a network interface 944. The user interface 942 can output to a display device and receive input from, for example, a keyboard. The network interface 944 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a controller coupled to a plurality of audio sensors collaborating for geo-location of events in an artificial intelligence (AI) environment, the method comprising the steps of:
    storing location information for each of a plurality of geographically-dispersed AI clients, each of the AI clients comprising an audio sensor, a network controller, and a feedback mechanism within a common enclosure;
    responsive to detection of an event at two or more of the plurality of geographically-dispersed AI clients, centrally receiving audio event data from audio sensors of the two or more of the plurality of geographically-dispersed AI sensors;
    estimating a location based on the location information and the audio event data;
    responsive to classification of the audio event data in view of the estimated location, receiving a command for a response to the event; and
    executing the command for the response to the event in order to produce an event response involving either: at least one of the plurality of geographically-dispersed AI clients or an application.

2. The method of claim 1, wherein the audio event data comprises a sound file capturing audio from the event.

3. The method of claim 2, wherein the sound file capturing the audio event is formed by audio sensors of the two or more of the plurality of geographically-dispersed audio sensors, wherein the audio sensors continuously store ambient audio in a temporary memory and, upon detecting the event, define a beginning point and an end point of the event corresponding to the sound file.

4. The method of claim 1, further comprising:
    classifying the audio event data by comparing the audio event data against a library of known audio data and corresponding identification of a human or machine event; and
    mapping the event classification to a command response that causes a change in an electronic device connected to the one of the plurality of geographically-dispersed AI clients.

5. The method of claim 1, wherein executing the response command comprises outputting a sound file corresponding to the event through a speaker at the at least one of the plurality of geographically-dispersed AI appliances.

6. The method of claim 1 wherein the executing the response command adjusts a setting on an electronic device connected to the at least one of the plurality of geographically-dispersed AI appliances, comprising at least one of: powering on, powering off, increasing an intensity, decreasing an intensity, initiating a script of commands, and ending a script of commands.

7. The method of claim 1, further comprising:
    responsive to classification of the audio event data, sending a request to an Internet resource and receiving a response from the Internet resource that affects the command response.

8. The method of claim 1, further comprising:
    determining a direction of movement for a subject of the event,
    wherein the audio event data comprises audio event data at a first time corresponding to a first location of the event and event data at a second time corresponding to a second location, and
    wherein the response command is based on the direction of movement of the subject.

9. The method of claim 8, further comprising:
    predicting a future location for response to the event subject based on a difference between the audio event at the first time and the audio event at the second time,
    wherein the response command is based on the predicted location.

10. The method of claim 9, wherein the executing the response comprises executing the response command to the event in order to produce the event response wherein the speaker of at least one of the plurality of geographically-dispersed AI appliances is proximate to the predicted future location.

11. The method of claim 1, wherein the event originates from natural human speech.

12. The method of claim 1, wherein the event originates from a human activity, an electronic device, an environmental activity, or an ambient condition.

13. The method of claim 1, wherein executing the response command comprises:
    executing the response command to the event in order to produce an event response involving an application that is an application that controls at least one of the plurality of geographically-dispersed AI clients.

14. The method of claim 1, wherein executing the response command comprises:
    executing the response command to the event in order to produce an event response involving an application that is a remote application.

15. The method of claim 1, wherein the AI environment comprises one or more of a home, business, an outdoor area, and an automobile.

16. A non-transitory computer-readable medium storing source code that, when executed by a processor, performs a method in a controller coupled to a plurality of audio sensors collaborating for geo-location of events in an artificial intelligence (AI) environment, the method comprising the steps of:
    storing location information for each of a plurality of geographically-dispersed AI clients, each of the AI clients comprising an audio sensor, a network controller, and a feedback mechanism within a common enclosure;

responsive to detection of an event at two or more of the plurality of geographically-dispersed AI clients, centrally receiving audio event data from audio sensors of the two or more of the plurality of geographically-dispersed AI sensors;

estimating a location based on the location information and the audio event data;

responsive to classification of the audio event data in view of the estimated location, receiving a command for a response to the event; and executing the command for the response to the event in order to produce an event response involving either at least one of the plurality of geographically-dispersed AI clients or an application.

17. A controller coupled to a plurality of audio sensors collaborating for geo-location of events in an artificial intelligence (AI) environment, the controller comprising:

a processor;

a memory, comprising:

a first module to store location information for each of a plurality of geographically-dispersed AI clients, each of the AI clients comprising an audio sensor, a network controller, and a feedback mechanism within a common enclosure;

a second module to, responsive to detection of an event at two or more of the plurality of geographically-dispersed AI clients, centrally receive audio event data from audio sensors of the two or more of the plurality of geographically-dispersed AI sensors;

a third module to estimate a location based on the location information and the audio event data;

a fourth module to, responsive to classification of the audio event data in view of the estimated location, receive a command for a response to the event; and a fifth module to execute the command for the response to the event in order to produce an event response involving either at least one of the plurality of geographically-dispersed AI clients or an application.

\* \* \* \* \*